United States Patent
Shimada et al.

(10) Patent No.: US 7,212,913 B1
(45) Date of Patent: May 1, 2007

(54) ENGINE CONTROL APPARATUS

(75) Inventors: Naoki Shimada, Hyogo (JP); Keiichiro Sakaigaki, Hyogo (JP); Koji Nishimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/408,917

(22) Filed: Apr. 24, 2006

(30) Foreign Application Priority Data

Nov. 22, 2005 (JP) ............................. 2005-336790

(51) Int. Cl.
*H02J 7/14* (2006.01)
*G06F 19/00* (2006.01)

(52) U.S. Cl. .................................... 701/114; 307/10.1
(58) Field of Classification Search ................ 701/114, 701/110, 115; 307/10.1, 9.1, 10.6, 66, 67
See application file for complete search history.

(56) References Cited

U.S. PATENT DOCUMENTS 5,848,659 A * 12/1998 Karg et al. ................. 180/65.4

6,114,775 A * 9/2000 Chung et al. ............ 307/710.1
6,975,046 B2 * 12/2005 Sumimoto ................... 307/9.1

FOREIGN PATENT DOCUMENTS

JP       2001-069681 A      3/2001
JP       2004-328820 A  *  11/2004

* cited by examiner

*Primary Examiner*—Hieu T. Vo
(74) *Attorney, Agent, or Firm*—Sughrue Mion, PLLC

(57) ABSTRACT

It is an object of the present invention to provide an engine control apparatus for detecting a voltage abnormality caused in a power supply thereof at low cost. An engine control apparatus for controlling an engine, includes: power supply voltage detecting unit for detecting a power supply voltage of a battery mounted on a vehicle as a power supply, which supplies the engine control apparatus with power; backup power supply voltage detecting unit for detecting a backup power supply voltage of a backup power supply, which supplies the engine control apparatus with power from the battery via a different path; voltage difference calculating unit for calculating a voltage difference between the power supply voltage and the backup power supply voltage; and power supply voltage abnormality determining unit for determining that there is an abnormality in the power supply voltage when the voltage difference is not within a predetermined range.

6 Claims, 10 Drawing Sheets

ENGINE CONTROL APPARATUS

BACKGROUND OF THE INVENTION

1. Field of the Invention

The present invention relates to an apparatus for controlling an engine, capable of detecting an abnormality in a power supply voltage supplied thereto.

2. Description of the Related Art

An apparatus for controlling an engine is supplied with power from a battery. The battery is charged by a generator mounted on a vehicle. The generator generates power when a field coil is excited with a field current and a power generation current is caused to flow through an armature coil rotating through rotation of the engine. Power generation control of the generator is performed by feedback control. That is, a control transistor is operated to be turned on and off to excite the field coil so that the voltage of the battery charged by the generator is held at a target voltage, and a target amount of power for making a voltage difference into zero is generated. The battery is charged through the power generation current, and the voltage of the battery is held at the target voltage.

When the output voltage of the generator has risen above an abnormally high voltage value, the field current is shut off to forcedly stop the power generation. Thus, the generator is protected from being destroyed through overcharge.

In order to detect an abnormality in a power supply voltage of the engine control apparatus, there is proposed a method using an ammeter (e.g., see JP 2001-69681 A).

However, the aforementioned protection against overcharge has the following problem. For instance, the engine control apparatus may operate by being supplied with power via a detour from a certain load terminal connected thereto when a power supply terminal of the engine control apparatus is disconnected. In this state, the power supply voltage supplied via the detour becomes lower than a normal power supply voltage due to a voltage drop. Accordingly, power generation control is performed based on this lowered power supply voltage, so the output voltage of the generator rises. While power generation can be forcedly stopped when the power supply voltage supplied via the detour is higher than an abnormally high voltage value, feedback control of the generator is performed when the output voltage of the generator is higher than the abnormally high voltage value but the power supply voltage supplied via the detour is equal to or lower than the abnormally high voltage value. Since power generation is then continued with the voltage higher than the abnormally high voltage value, the generator is destroyed through overcharge.

Further, since the ammeter is used as a detection unit, there is also a problem of high cost.

SUMMARY OF THE INVENTION

It is an object of the present invention to provide an engine control apparatus for detecting a voltage abnormality caused in a power supply of the engine control apparatus at low cost.

An engine control apparatus for controlling an engine, according to the present invention, includes: power supply voltage detecting means for detecting a power supply voltage of a battery mounted on a vehicle as a power supply, which supplies the engine control apparatus with power; and backup power supply voltage detecting means for detecting a backup power supply voltage of a backup power supply, which supplies the engine control apparatus with power from the battery via a different path. The engine control apparatus further includes: voltage difference calculating means for calculating a voltage difference between the power supply voltage and the backup power supply voltage; and power supply voltage abnormality determining means for determining that there is an abnormality in the power supply voltage when the voltage difference is not within a predetermined range.

An abnormality in the power supply voltage of the engine control apparatus according to the present invention is detected by comparing a power supply voltage of the engine control apparatus with a power supply voltage of a different power supply which is supplied with power from the battery via a different path. Thus, the engine control apparatus achieves the effects of eliminating the necessity to prepare an ammeter separately and detecting an abnormality in the power supply voltage at low cost.

DETAILED DESCRIPTION OF THE PREFERRED EMBODIMENTS

The gist of an engine control apparatus according to the present invention consists in determining whether or not a voltage difference between a power supply voltage of a power supply line of the engine control apparatus supplied with power from a battery and a power supply voltage of a different power supply line supplied with power from the battery via a different path is equal to or larger than a predetermined value, and determining that the power supply voltage of the power supply line of the engine control apparatus is abnormal when the voltage difference is equal to or larger than the predetermined value. The following description will be given citing a backup power supply line and a load-side power supply line as examples of the different power supply line supplied with power from the battery via the different path. However, the present invention should not be limited to these examples.

First Embodiment

Figure 1:
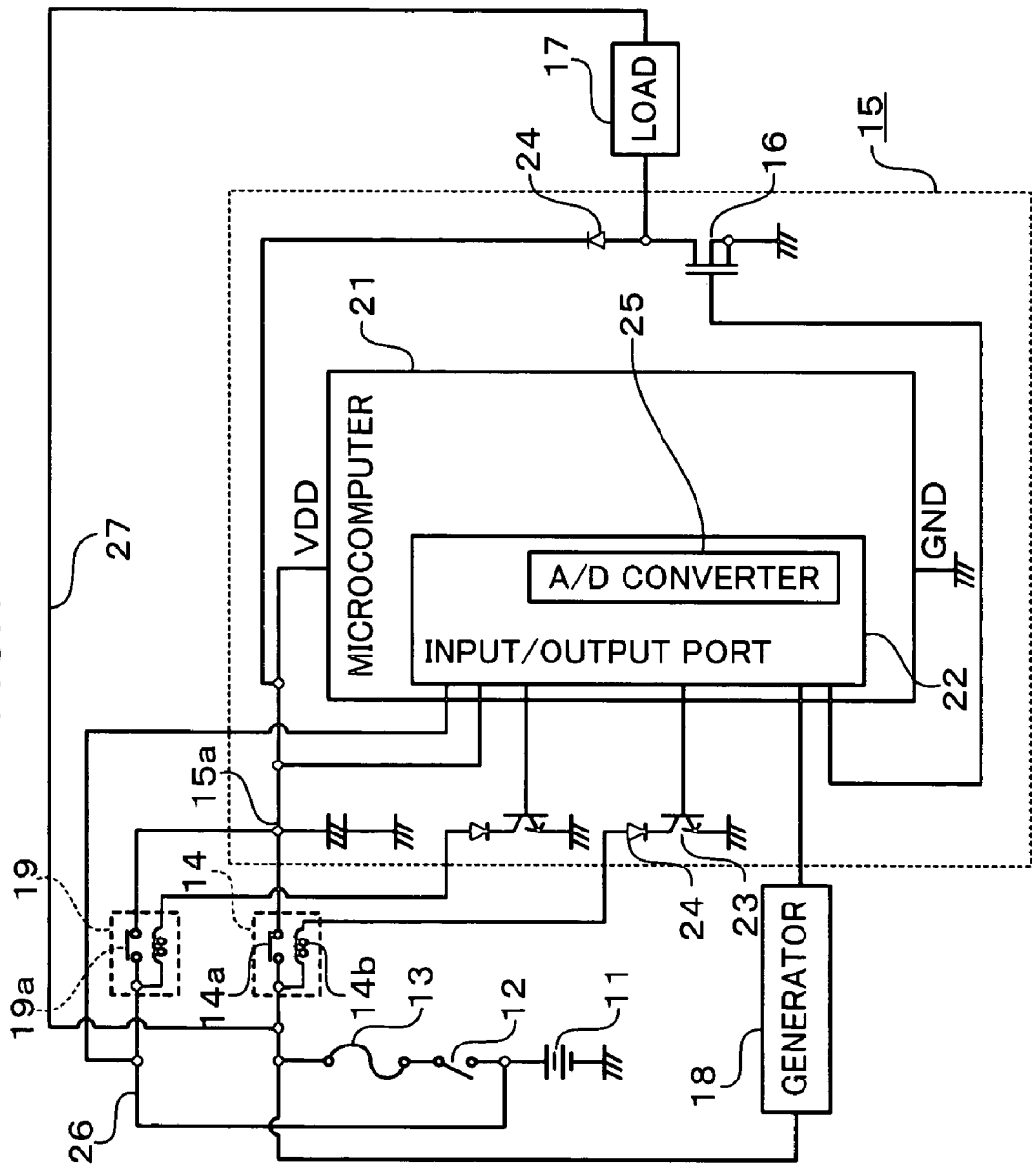
FIG. 1 is a schematic diagram of an engine control apparatus according to a first embodiment of the present invention.
Figure 2:
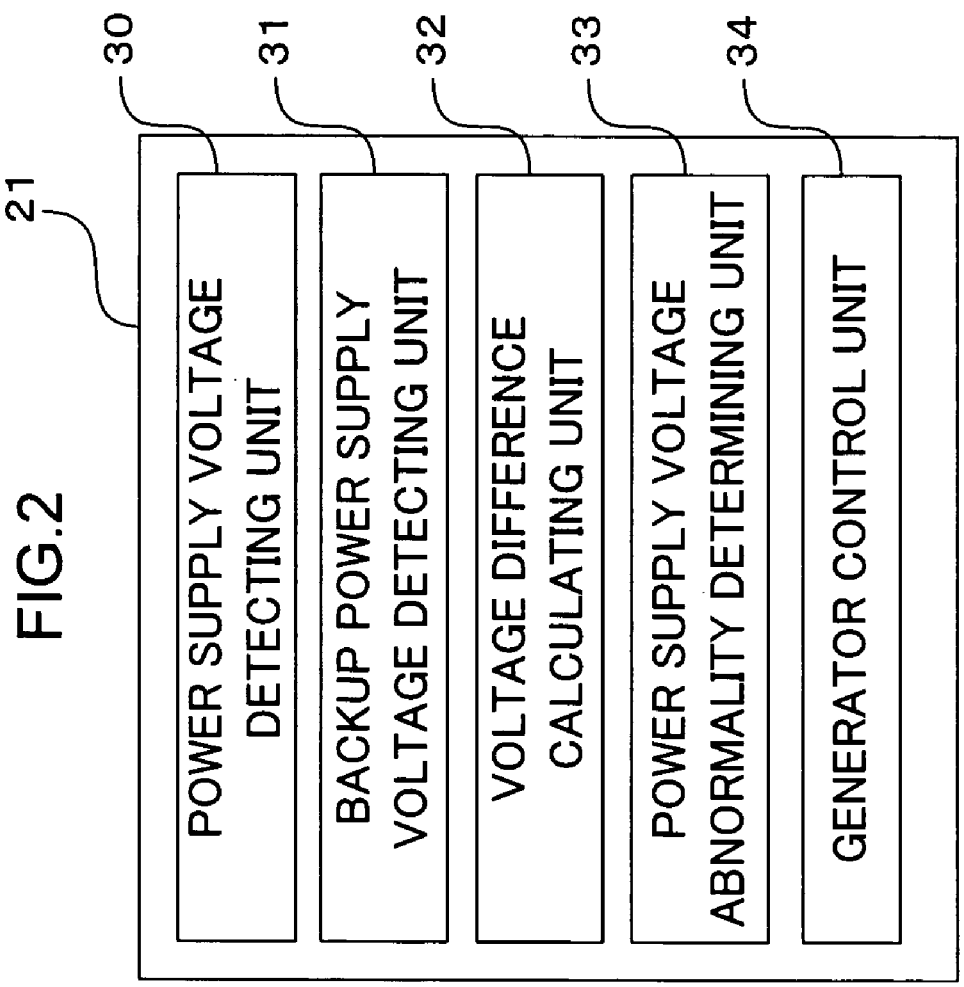
FIG. 2 is a functional block diagram of a microcomputer according to the first embodiment of the present invention.
Figure 3:
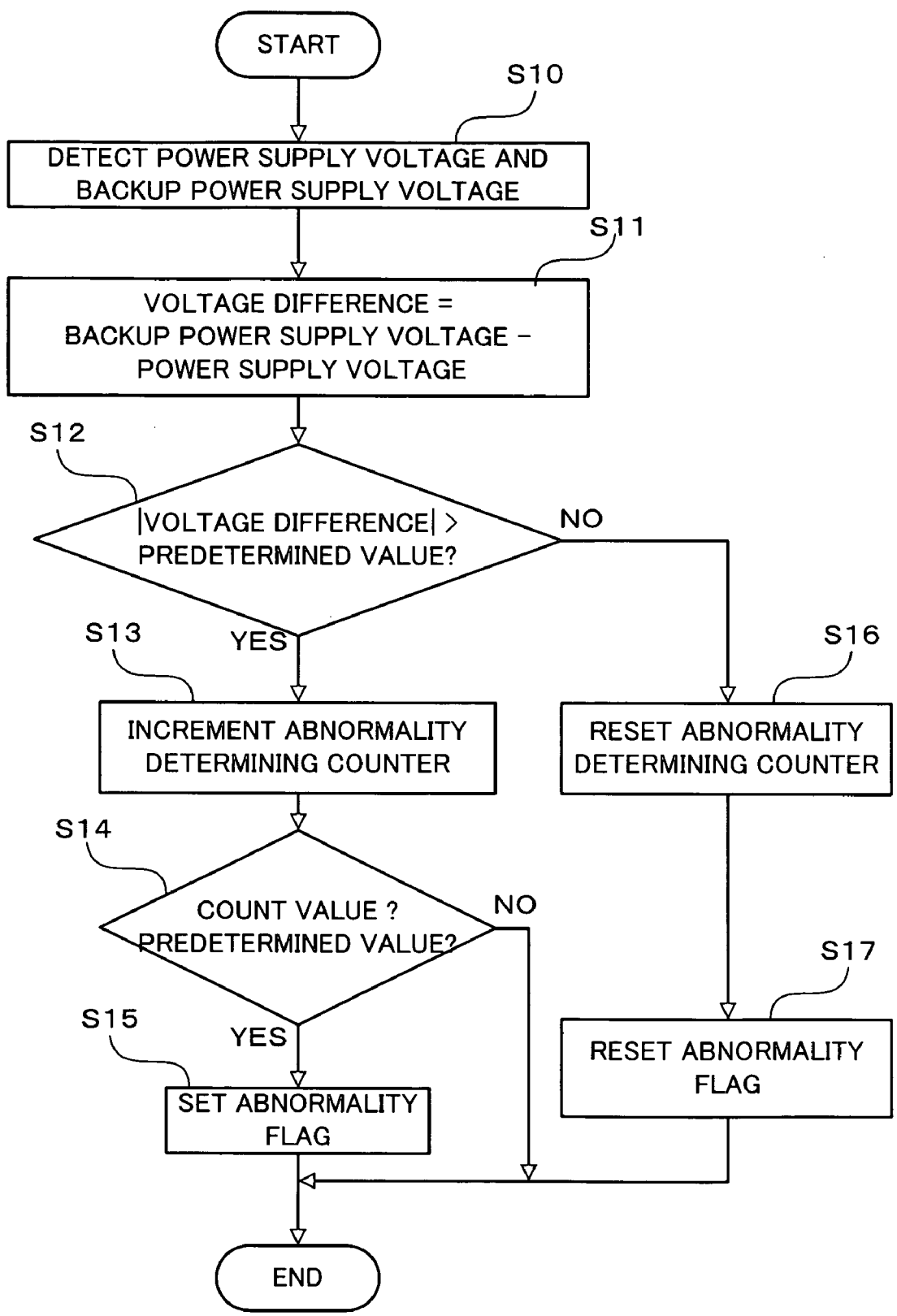
FIG. 3 is a flowchart showing a power supply voltage abnormality detecting routine executed in the engine control apparatus according to the first embodiment of the present invention.
Figure 4:
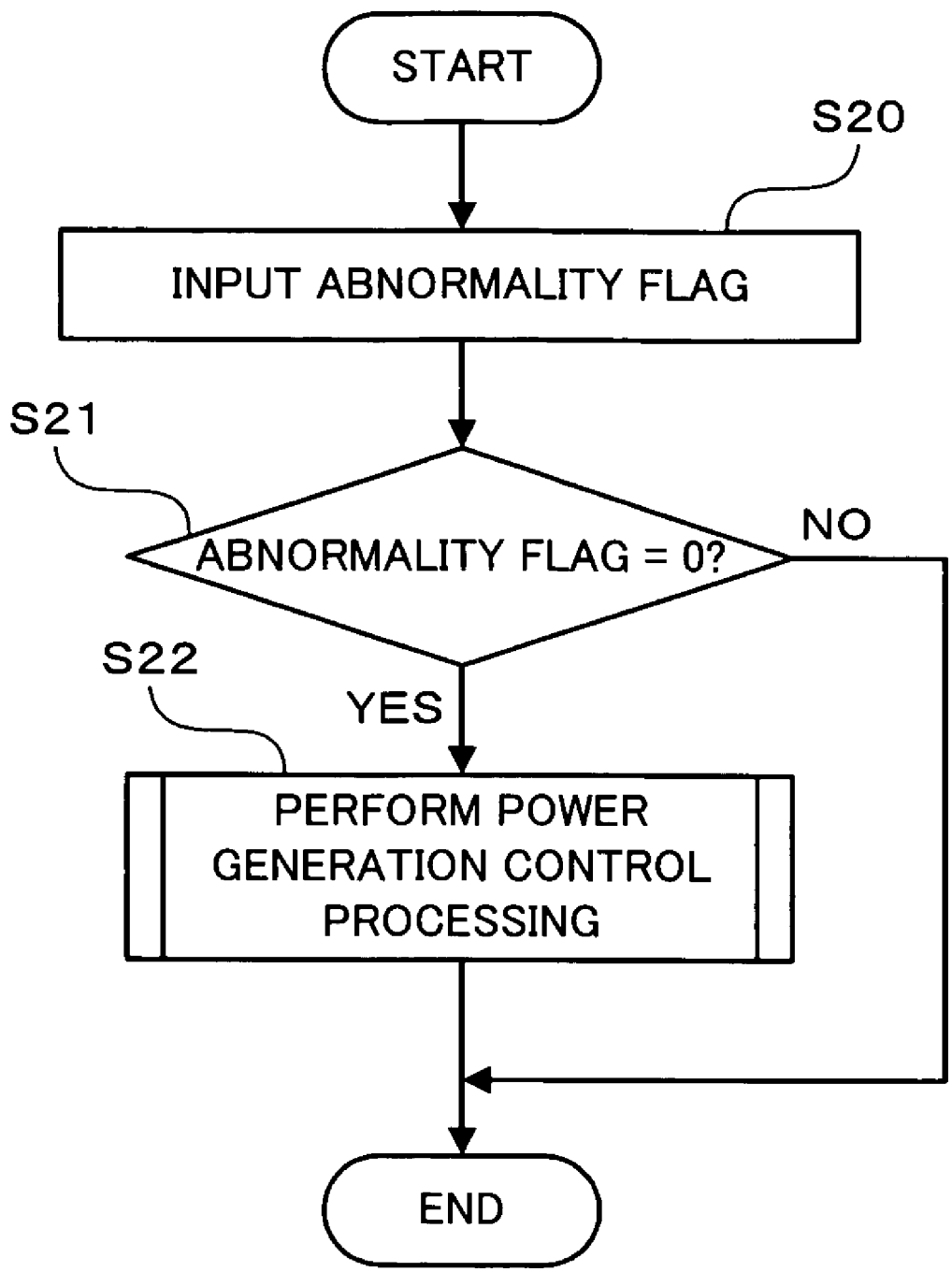
FIG. 4 is a flowchart showing a power generation control processing routine executed in the engine control apparatus according to the first embodiment of the present invention.

FIG. 1 is a schematic diagram of an engine control apparatus according to the first embodiment of the present invention. FIG. 2 is a functional block diagram of a microcomputer according to the first embodiment of the present invention. FIG. 3 is a flowchart showing a power supply voltage abnormality detecting routine executed in the engine control apparatus according to the first embodiment of the present invention. FIG. 4 is a flowchart showing a power generation control processing routine executed in the engine control apparatus according to the first embodiment of the present invention.

An engine control apparatus 15 according to the first embodiment of the present invention drives a load 17 related to operation of an engine (not shown). The engine control apparatus 15 controls the charge/discharge of a battery 11, which supplies the engine control apparatus 15 and the load 17 with power.

The battery 11 is connected to a power supply line 15a of the engine control apparatus 15 and a load-side power supply line 27 of the load 17 via an ignition switch 12, a fuse 13, and a relay switch 14a of a main relay 14. The battery 11 is connected, as a backup power supply, to the power supply line 15a of the engine control apparatus 15 via a relay switch 19a of a subsidiary relay 19 as well. When the power supply voltage of the power supply line 15a has become lower than a permissible voltage, the subsidiary relay 19 is driven to connect a backup power supply line 26 to the power supply line 15a. A drive coil 14b of the main relay 14 is connected to the engine control apparatus 15.

When a signal generated in response to the closure of the ignition switch 12 is inputted to the engine control apparatus 15 and a current is caused to flow through the drive coil 14b of the main relay 14 based on the signal, the relay switch 14a of the main relay 14 is thereby closed. As a result, the power supply line 15a of the engine control apparatus 15 and the load 17 are supplied with power.

An output of the generator 18, which can generate power through transmission of rotation of the engine, is inputted between the fuse 13 and the main relay 14. A voltage of the power supply line 15a of the engine control apparatus 15 is compared with a predetermined threshold, so a current for exciting a field coil (not shown) of the generator 18 is caused to flow from the engine control apparatus 15. Power generation by the generator 18 is thereby controlled. As a result, the terminal voltage of the battery 11 is held constant.

The engine control apparatus 15 includes a microcomputer 21 equipped with a CPU, a ROM for storing a processing program processed by the CPU, a RAM for temporarily storing a calculation result during calculation by the CPU, and an input/output port 22. A transistor 16 for driving the load 17, the field coil of the generator 18, and a transistor 23 for driving the drive coil 14b of the main relay 14 are connected to the input/output port 22 of the microcomputer 21. Diodes 24 for causing flyback energy to flow backward are connected to the transistors 16 and 23 respectively.

The power supply line 15a of the engine control apparatus 15 and the backup power supply line 26 are connected to the input/output port 22. The input/output port 22 is equipped with an A/D converter 25 for performing A/D conversion of a power supply voltage of the power supply line 15a and a backup power supply voltage of the backup power supply line 26 as analog values into digital values. Although not shown in FIG. 1, various sensors for controlling the engine are connected to the input/output port 22.

Next, functions of the microcomputer 21 will be described with reference to FIG. 2.

As shown in FIG. 2, the microcomputer 21 has a power supply voltage detecting unit 30 for detecting a power supply voltage of the power supply line 15a of the engine control apparatus 15 (hereinafter referred to simply as the power supply voltage), a backup power supply voltage detecting unit 31 for detecting a backup power supply voltage of the backup power supply line 26 (hereinafter referred to simply as the backup power supply voltage), a voltage difference calculating unit 32 for calculating a voltage difference between the power supply voltage and the backup power supply voltage, a power supply voltage abnormality determining unit 33 for making a determination on an abnormality in the power supply voltage of the power supply line 15a of the engine control apparatus 15 based on the voltage difference, and a generator control unit 34 for controlling the generator 18 based on a result of the determination on the abnormality.

Next, an operation of detecting an abnormality in the power supply voltage of the power supply line 15a of the engine control apparatus 15 according to the first embodiment of the present invention will be described with reference to FIG. 3.

A routine for detecting an abnormality in the power supply voltage as shown in FIG. 3 is repeatedly executed at intervals of a predetermined cycle of, for example, 25 milliseconds after a vehicle has been started. An abnormality determining counter and an abnormality flag are initialized when the vehicle is started. In other words, the abnormality determining counter is set, and the abnormality flag is set to 0.

In step S10, when the power supply voltage abnormality detecting routine is started, the power supply voltage detecting unit 30 detects a power supply voltage from the A/D converter 25, and the backup power supply voltage detecting unit 31 detects a backup power supply voltage.

In step S11, the voltage difference calculating unit 32 calculates a voltage difference between the backup power supply voltage and the power supply voltage.

In step S12, the power supply voltage abnormality determining unit 33 determines whether or not the absolute value of the voltage difference is larger than a predetermined voltage value, and makes a transition to step S13 when the absolute value of the voltage difference is larger than the predetermined voltage value, or makes a transition to step S16 when the absolute value of the voltage difference is equal to or smaller than the predetermined voltage value.

In step S13, the power supply voltage abnormality determining unit 33 determines that there is some abnormality in the power supply voltage of the engine control apparatus 15, and increments the abnormality determining counter.

In step S14, the power supply voltage abnormality determining unit 33 determines whether or not the count value of the abnormality determining counter is equal to or larger than a predetermined count value, and makes a transition to step S15 when it is determined that the count value is equal to or larger than the predetermined value, or terminates the power supply voltage abnormality detecting routine when it is determined that the count value is smaller than the predetermined count value.

In step S15, the power supply voltage abnormality determining unit 33 determines that there is an abnormality in the power supply voltage of the engine control apparatus 15, and sets the abnormality flag to 1, thereby terminating the power supply voltage abnormality detecting routine.

In step S16, the power supply voltage abnormality determining unit 33 resets the abnormality determining counter to 0, and makes a transition to step S17.

In step S17, the power supply voltage abnormality determining unit 33 sets the abnormality flag to 0; thereby terminating the power supply voltage abnormality detecting routine.

As described above, an abnormality in the power supply voltage of the power supply line 15a of the engine control apparatus 15 is detected by comparing the power supply voltage with the backup power supply voltage of the backup power supply line 26, which leads to the engine control apparatus 15 from the battery 11 via the different path. Therefore, there is no need to prepare an ammeter or the like separately. Consequently, an abnormality in the power supply voltage can be detected at low cost.

Next, a power generation control processing of the generator 18 will be described with reference to FIG. 4.

A power generation control processing routine shown in FIG. 4 is repeatedly executed at intervals of a predetermined cycle of, for example, 5 milliseconds after the vehicle has been started.

In step S20, when the power generation control processing routine is started, the generator control unit 34 reads the abnormality flag set in the power supply voltage abnormality detecting routine, and makes a transition to step S21. More specifically, the generator control unit 34 accesses a predetermined address of the RAM of the engine control apparatus 15 into which the abnormality flag has been written.

In step S21, the generator control unit 34 checks whether the value set in the abnormality flag is 0 or 1, and makes a transition to step S22 when the value is 0, or terminates the generator control processing routine when the value is 1.

In step S22, the generator control unit 34 determines that there is no abnormality in the power supply voltage, and performs normal power generation control, thereby terminating the power generation control processing routine.

As described above, power generation is stopped without performing power generation control when there is an abnormality in the power supply voltage of the engine control apparatus 15. Therefore, the generator 18 can be prevented from being destroyed through overcharge resulting from the continuation of power generation.

Second Embodiment

Figure 5:
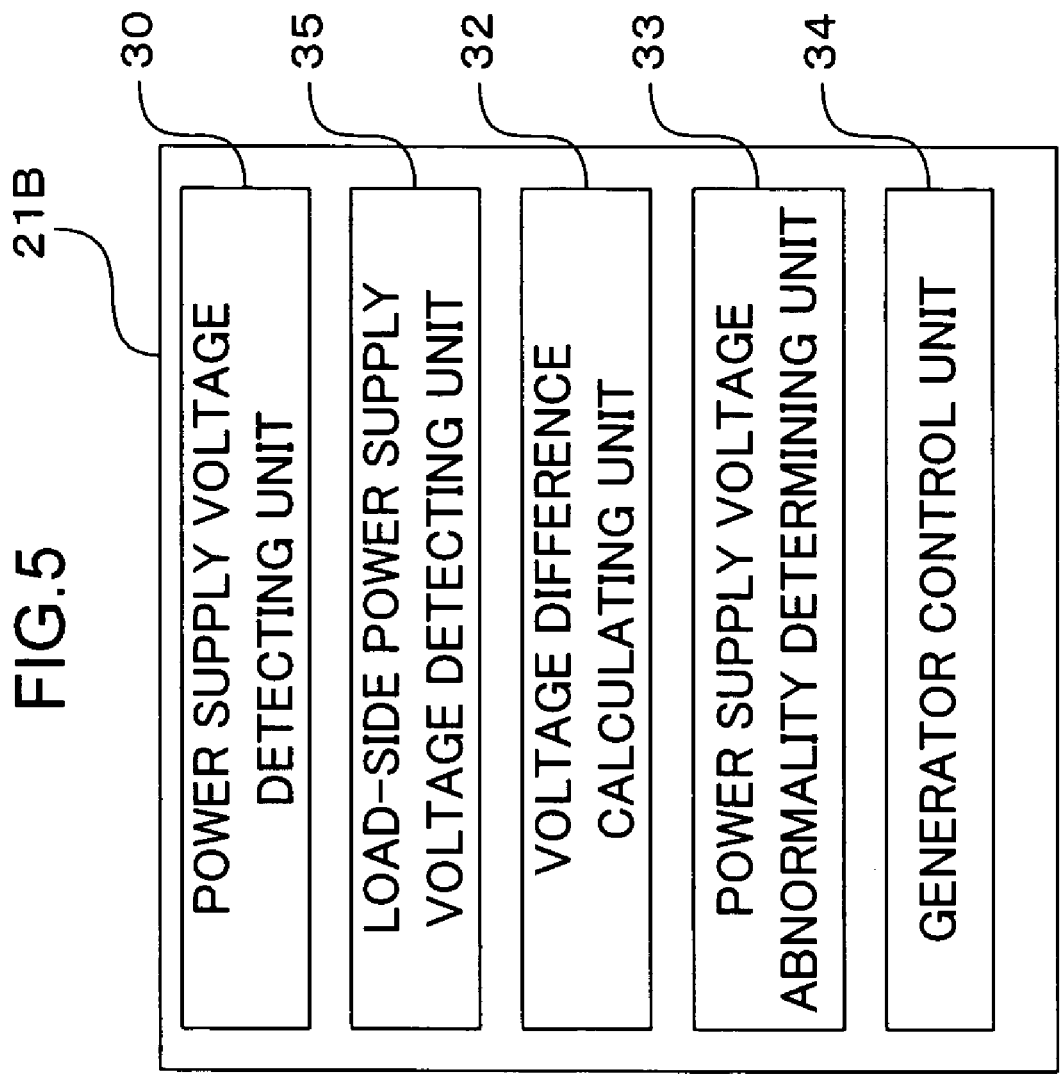
FIG. 5 is a functional block diagram of a microcomputer according to a second embodiment of the present invention.
Figure 6:
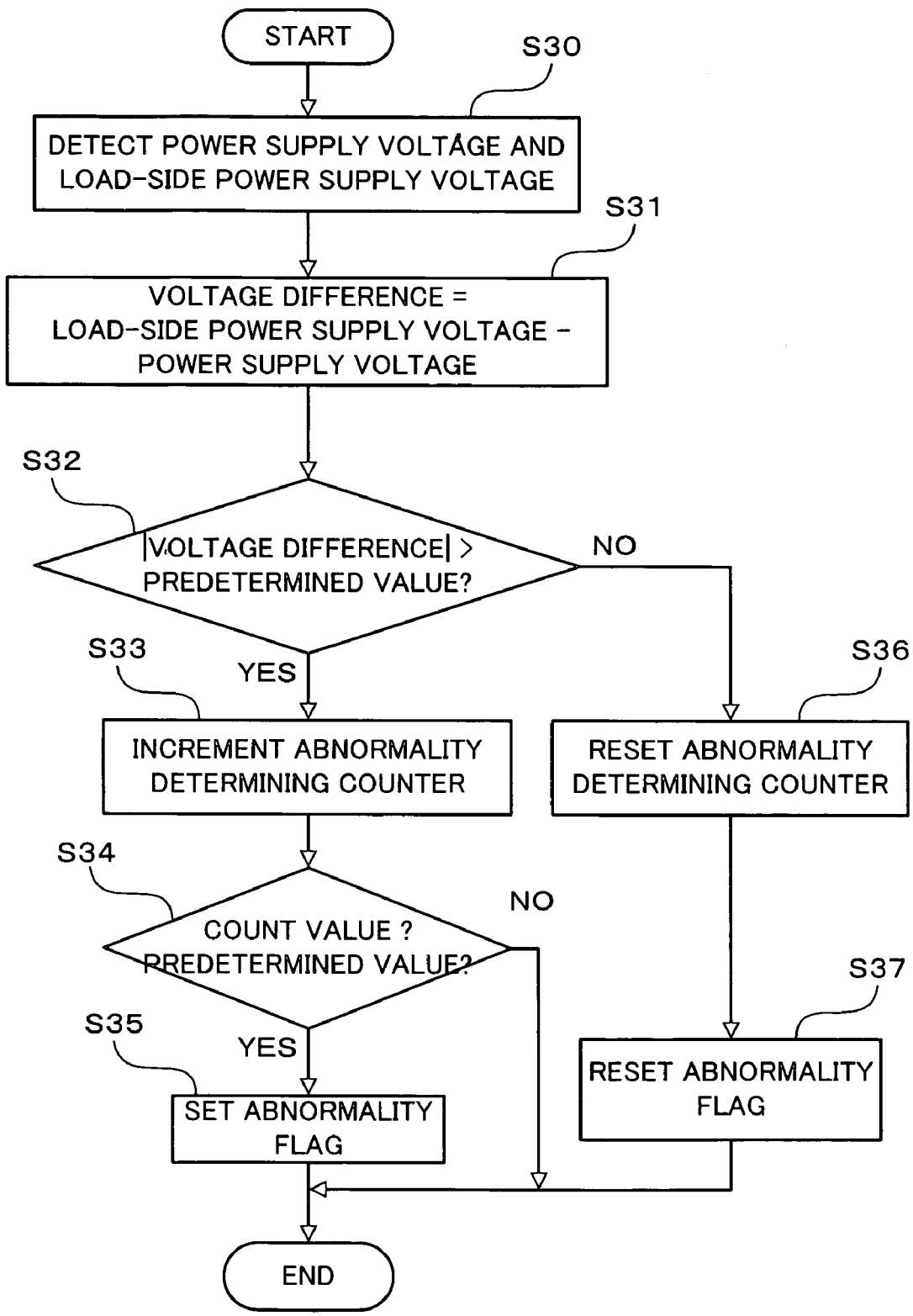
FIG. 6 is a flowchart showing a power supply voltage abnormality detecting routine executed in an engine control apparatus according to the second embodiment of the present invention.

FIG. 5 is a functional block diagram of a microcomputer according to the second embodiment of the present invention. FIG. 6 is a flowchart showing a power supply voltage abnormality detecting routine executed in an engine control apparatus according to the second embodiment of the present invention.

The engine control apparatus according to the second embodiment of the present invention is different from the engine control apparatus according to the first embodiment of the present invention in that a power supply voltage for the load is used as a value to be compared with the power supply voltage instead of the backup power supply voltage. Since they are identical to each other in other respects, the description of identical parts will be omitted by assigning thereto the same symbols as in the first embodiment of the present invention.

A microcomputer 21B according to the second embodiment of the present invention is different from the microcomputer 21 according to the first embodiment of the present invention in that the backup power supply voltage detecting unit 31 has been replaced with a load-side power supply voltage detecting unit 35. Since they are identical to each other in other respects, the description of identical parts will be omitted by assigning thereto the same symbols as in the first embodiment of the present invention.

The load-side power supply voltage detecting unit 35 detects a load-side power supply voltage of the load-side power supply line 27 for supplying the load 17 with load-side power from the battery 11.

Next, an operation of detecting an abnormality in the power supply voltage of the power supply line of the engine control apparatus according to the first embodiment of the present invention will be described with reference to FIG. 6.

A routine for detecting an abnormality in the power supply voltage as shown in FIG. 6 is repeatedly executed at intervals of a predetermined cycle of, for example, 25 milliseconds after a vehicle has been started. An abnormality determining counter and an abnormality flag are initialized when the vehicle is started. In other words, the abnormality determining counter is set, and the abnormality flag is set to 0.

In step S30, when the power supply voltage abnormality detecting routine is started, the power supply voltage detecting unit 30 detects a power supply voltage from the A/D converter 25, and the backup power supply voltage detecting unit 31 detects a backup power supply voltage.

In step S31, the voltage difference calculating unit 32 calculates a voltage difference between the backup power supply voltage and the power supply voltage.

In step S32, the power supply voltage abnormality determining unit 33 determines whether or not the absolute value of the voltage difference is larger than a predetermined voltage value, and makes a transition to step S33 when the absolute value of the voltage difference is larger than the predetermined voltage value, or makes a transition to step S36 when the absolute value of the voltage difference is equal to or smaller than the predetermined voltage value.

In step S33, the power supply voltage abnormality determining unit 33 determines that there is some abnormality in the power supply voltage of the engine control apparatus, and increments the abnormality determining counter.

In step S34, the power supply voltage abnormality determining unit 33 determines whether or not the count value of the abnormality determining counter is equal to or larger than a predetermined count value, and makes a transition to step S35 when it is determined that the count value is equal to or larger than the predetermined value, or terminates the power supply voltage abnormality detecting routine when it is determined that the count value is smaller than the predetermined count value.

In step S35, the power supply voltage abnormality determining unit 33 determines that there is an abnormality in the power supply voltage of the engine control apparatus 15, and sets the abnormality flag to 1, thereby terminating the power supply voltage abnormality detecting routine.

In step S36, the power supply voltage abnormality determining unit 33 resets the abnormality determining counter to 0, and makes a transition to step S17.

In step S37, the power supply voltage abnormality determining unit 33 sets the abnormality flag to 0, thereby terminating the power supply voltage abnormality detecting routine.

As described above, an abnormality in the power supply voltage of the power supply line 15a of the engine control apparatus 15 is detected by comparing the power supply voltage with the backup power supply voltage of the backup power supply line 26, which leads to the engine control apparatus 15 from the battery 11 via the different path. Therefore, there is no need to prepare an ammeter or the like separately. Consequently, an abnormality in the power supply voltage can be detected at low cost.

Third Embodiment

Figure 7:
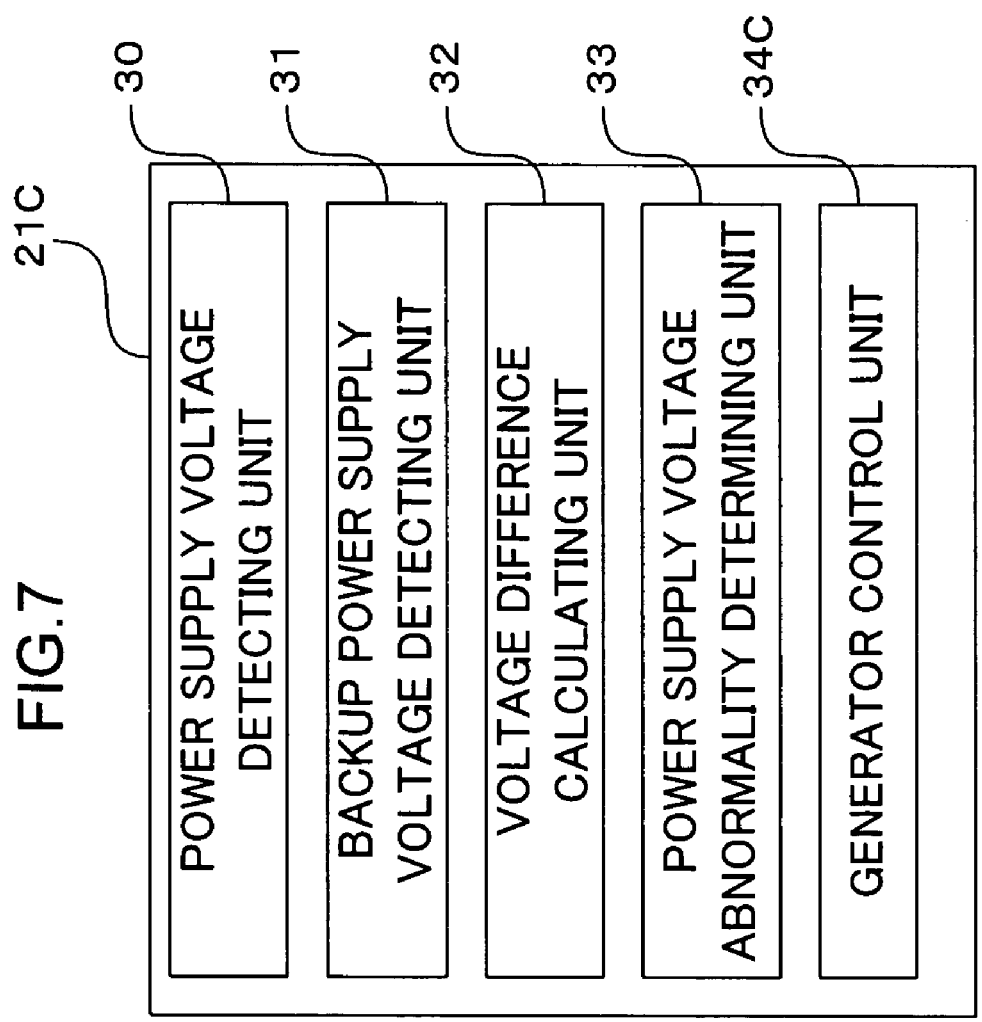
FIG. 7 is a functional block diagram of a microcomputer according to a third embodiment of the present invention.

FIG. 7 is a functional block diagram of a microcomputer according to the third embodiment of the present invention. FIG. 6 is a flowchart showing a power supply voltage abnormality detecting routine executed in an engine control apparatus according to the second embodiment of the present invention.

The engine control apparatus according to the first embodiment of the present invention is different from the engine control apparatus according to the first embodiment of the present invention in that a power supply voltage for the load is used as a value to be compared with the power supply voltage instead of the backup power supply voltage. Since they are identical to each other in other respects, the description of identical parts will be omitted by assigning thereto the same symbols as in the first embodiment of the present invention.

A microcomputer 21C according to the third embodiment of the present invention is different from the microcomputer 21 according to the first embodiment of the present invention in that the backup power supply voltage detecting unit 31 has been replaced with a load-side power supply voltage detecting unit 35. Since they are identical to each other in other respects, the description of identical parts will be omitted by assigning thereto the same symbols as in the first embodiment of the present invention.

The generator control unit 34C according to the third embodiment of the present invention feedback-controls the power generation amount of the generator 18 based on the power supply voltage when normal power generation control is performed, or feedback-controls the power generation amount of the generator 18 based on the backup power supply voltage when it is determined that there is an abnormality in the power supply voltage.

Next, a power generation control processing of the generator 18 according to the third embodiment of the present invention will be described with reference to FIG. 8.

Figure 8:
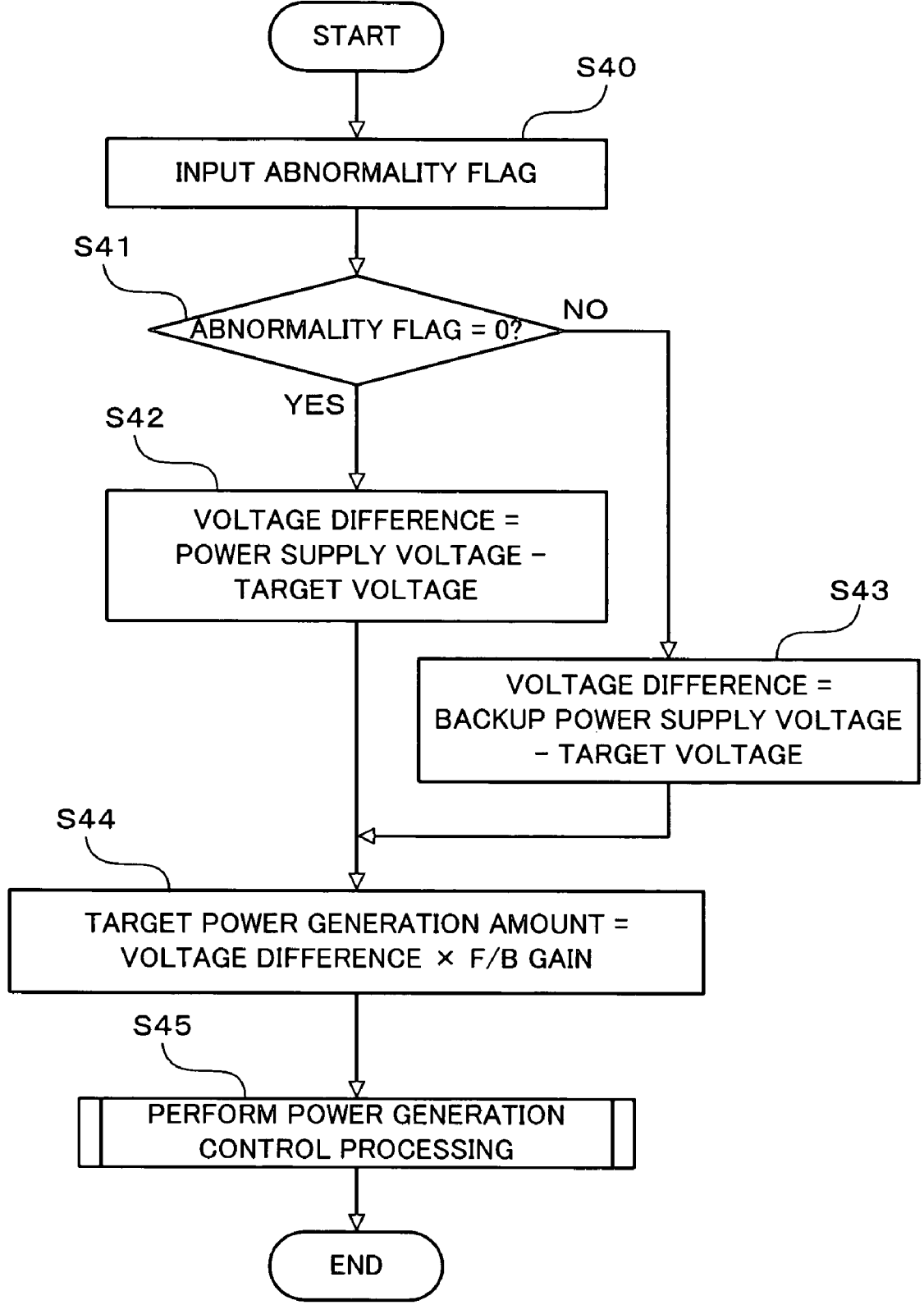
FIG. 8 is a flowchart showing a power generation control processing routine executed in an engine control apparatus according to the third embodiment of the present invention.

A power generation control processing routine shown in FIG. 8 is repeatedly executed at intervals of a predetermined cycle of, for example, 5 milliseconds after the vehicle has been started.

In step 40, when the power generation control processing routine is started, the generator control unit 34C reads the abnormality flag set in the power supply voltage abnormality detecting routine and makes a transition to step S41. More specifically, the generator control unit 34C accesses a predetermined address of the RAM of the engine control apparatus 15C into which the abnormality flag has been written.

In step S41, the generator control unit 34C checks whether the value set in the abnormality flag is 0 or 1, makes a transition to step S42 when the value is 0, or makes a transition to step S43 when the value is 1.

In step S42, the generator control unit 34C determines that there is no abnormality in the power supply voltage, calculates a voltage difference by subtracting a target voltage from the power supply voltage, and makes a transition to step S44.

In step S43, the generator control unit 34C determines that there is an abnormality in the power supply voltage, calculates a voltage difference by subtracting a target voltage from the backup power supply voltage, and makes a transition to step S44.

In step S44, the generator control unit 34C calculates a target power generation amount by multiplying the voltage difference by an F/B gain, and makes a transition to step S45.

In step S45, the generator control unit 34C performs power generation control based on the target power generation amount, thereby terminating the power generation control processing routine.

As described above, power generation is continued while performing feedback control using the backup power supply voltage such that the voltage of the battery 11 becomes equal to the target voltage. It is therefore possible to ensure a sufficient amount of power for traveling to an auto-repair garage or the like without the aid of another vehicle from a spot where it is determined that there is an abnormality in the power supply voltage.

Since the voltage of the battery 11 is monitored using the backup power supply voltage, it is possible to prevent overcharge of the battery 11 which may occur when power generation is continued.

Fourth Embodiment

Figure 9:
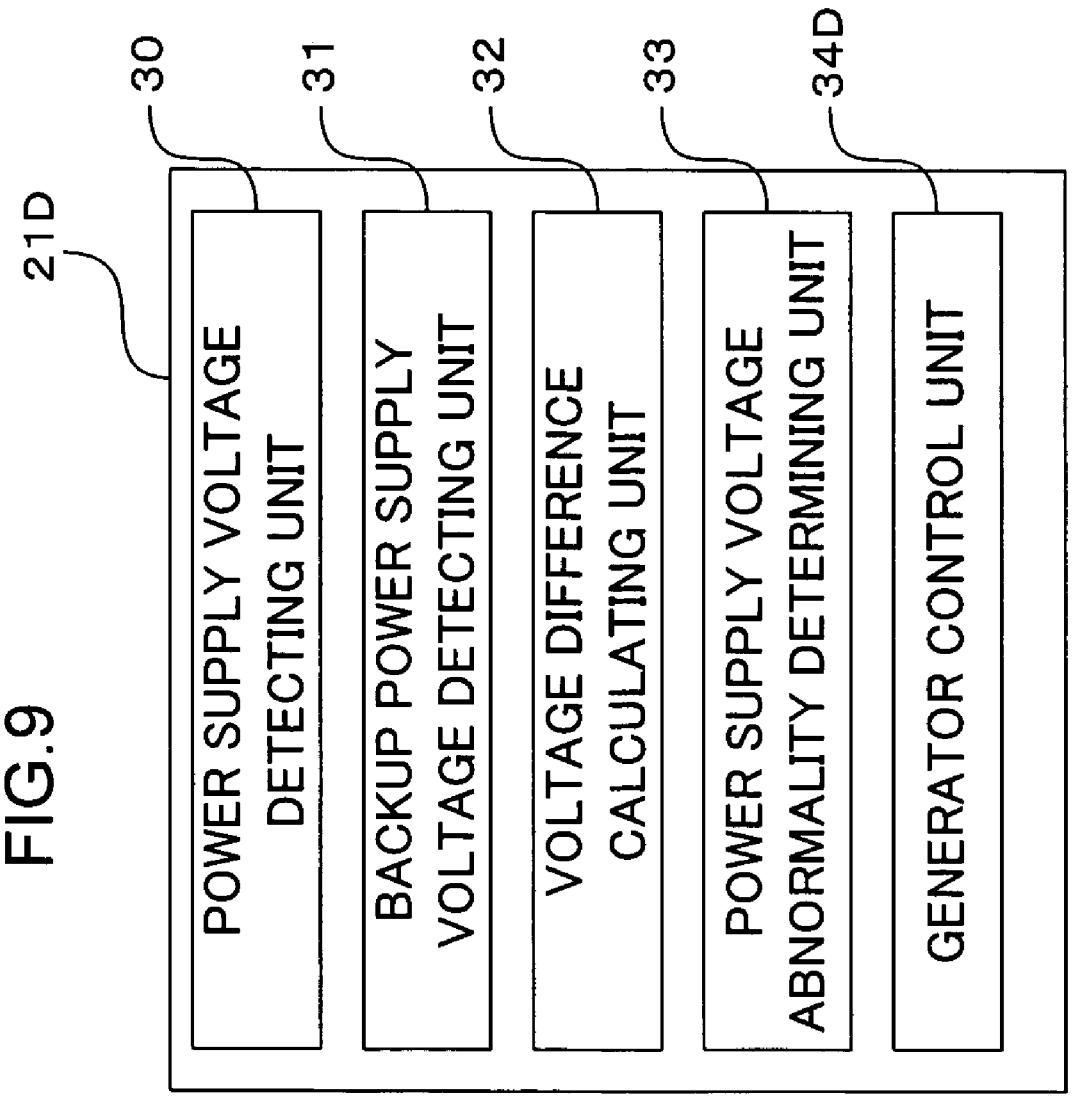
FIG. 9 is a functional block diagram of a microcomputer according to a fourth embodiment of the present invention.
Figure 10:
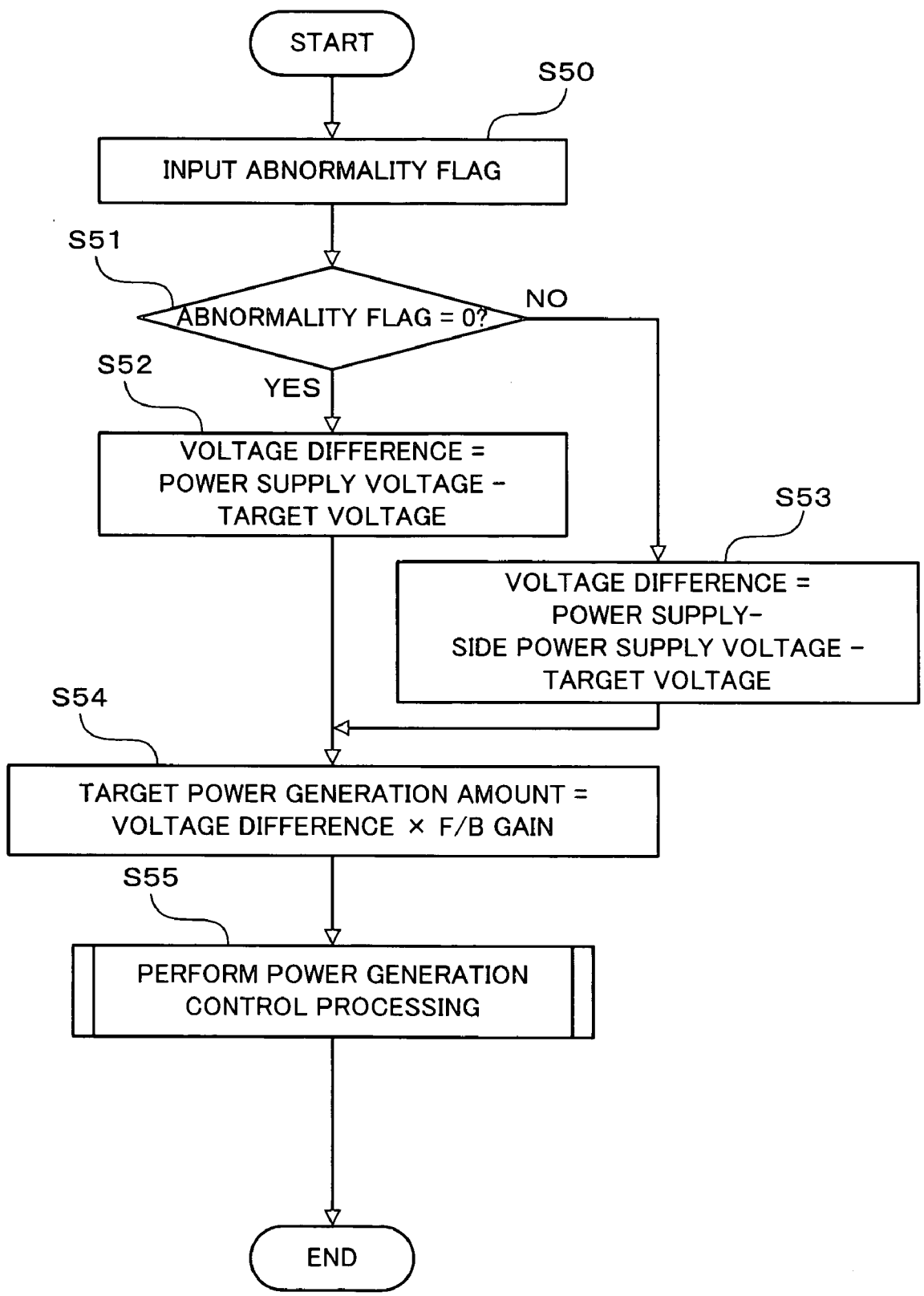
FIG. 10 is a flowchart showing a power generation control processing routine executed in an engine control apparatus according to the fourth embodiment of the present invention.

FIG. 9 is a functional block diagram of a microcomputer according to the second embodiment of the present invention. FIG. 10 is a flowchart showing a power supply voltage abnormality detecting routine executed in an engine control apparatus according to the fourth embodiment of the present invention.

The engine control apparatus according to the fourth embodiment of the present invention is different from the engine control apparatus according to the second embodiment of the present invention in that a power supply voltage for the load is used as a value to be compared with the power supply voltage instead of the backup power supply voltage. Since they are identical to each other in other respects, the description of identical parts will be omitted by assigning thereto the same symbols as in the first embodiment of the present invention.

The generator control unit 34D according to the fourth embodiment of the present invention feedback-controls the power generation amount of the generator 18 based on the power supply voltage when normal power generation control is performed, or feedback-controls the power generation amount of the generator 18 based on the backup power supply voltage when it is determined that there is an abnormality in the power supply voltage.

Next, a power generation control processing of the generator 18 according to the fourth embodiment of the present invention will be described with reference to FIG. 10.

A power generation control processing routine shown in FIG. 8 is repeatedly executed at intervals of a predetermined cycle of, for example, 5 milliseconds after the vehicle has been started.

In step 50, when the power generation control processing routine is started, the generator control unit 34C reads the abnormality flag set in the power supply voltage abnormality detecting routine and makes a transition to step S51. More specifically, the generator control unit 34D accesses a predetermined address of the RAM of the engine control apparatus 15C into which the abnormality flag has been written.

In step S51, the generator control unit 34C checks whether the value set in the abnormality flag is 0 or 1, makes a transition to step S53 when the value is 0, or makes a transition to step S53 when the value is 1.

In step S52, the generator control unit 34D determines that there is no abnormality in the power supply voltage, calculates a voltage difference by subtracting a target voltage from the power supply voltage, and makes a transition to step S44.

In step S53, the generator control unit 34D determines that there is an abnormality in the power supply voltage, calculates a voltage difference by subtracting a target voltage from the backup power supply voltage, and makes a transition to step S44.

In step S54, the generator control unit 34D calculates a target power generation amount by multiplying the voltage difference by an F/B gain, and makes a transition to step S45.

In step S55, the generator control unit 34C performs power generation control based on the target power generation amount, thereby terminating the power generation control processing routine.

As described above, power generation is continued while performing feedback control using the load-side power supply voltage detecting unit such that the voltage of the battery 11 becomes equal to the target voltage. It is therefore possible to ensure a sufficient amount of power for traveling to an auto-repair garage or the like without the aid of another vehicle from a spot where it is determined that there is an abnormality in the power supply voltage.

Since the voltage of the battery 11 is monitored using the load-side power supply voltage detecting unit, it is possible to prevent overcharge of the battery 11 which may occur when power generation is continued.

Although the first to fourth embodiments of the present invention have been described using the examples, the present invention is not limited thereto at all. It goes without saying that the present invention can be realized as various embodiments as long as they do not depart from the spirit of the present invention.

What is claimed is:

1. An engine control apparatus for controlling an engine, comprising:
    power supply voltage detecting means for detecting a power supply voltage of a battery mounted on a vehicle as a power supply, which supplies the engine control apparatus with power;
    backup power supply voltage detecting means for detecting a backup power supply voltage of a backup power supply, which supplies the engine control apparatus with power from the battery via a different path;
    voltage difference calculating means for calculating a voltage difference between the power supply voltage and the backup power supply voltage; and
    power supply voltage abnormality determining means for determining that there is an abnormality in the power supply voltage when the voltage difference is not within a predetermined range.

2. An engine control apparatus for controlling an engine according to claim 1, further comprising generator control means for controlling power generation by a generator for charging the battery based on the power supply voltage when the voltage difference is within the predetermined range, and stopping power generation by the generator when the voltage difference is not within the predetermined range.

3. An engine control apparatus, for controlling an engine according to claim 1, further comprising generator control means for controlling power generation by a generator for charging the battery based on the power supply voltage when the voltage difference is within the predetermined range, and controlling power generation by the generator based on the backup power supply voltage when the voltage difference is not within the predetermined range.

4. An engine control apparatus for controlling an engine, comprising:
    power supply voltage detecting means for detecting a power supply voltage of a battery mounted on a vehicle as a power supply, which supplies the engine control apparatus with power;
    load-side power supply voltage detecting means for detecting a load-side power supply voltage of a load-side power supply, which supplies a load driven by the engine control apparatus with power from the battery;
    voltage difference calculating means for calculating a voltage difference between the power supply voltage and the load-side power supply voltage; and
    power supply voltage abnormality determining means for determining that there is an abnormality in the power supply voltage when the voltage difference is not within a predetermined range.

5. An engine control apparatus for controlling an engine according to claim 4, further comprising generator control means for controlling power generation by a generator for charging the battery based on the power supply voltage when the voltage difference is within the predetermined range, and stopping power generation by the generator when the voltage difference is not within the predetermined range.

6. An engine control apparatus for controlling an engine according to claim 4, further comprising generator control means for controlling power generation by a generator for charging the battery based on the load-side power supply voltage when the voltage difference is within the predetermined range, and controlling power generation by the generator based on the backup power supply voltage when the voltage difference is not within the predetermined range.

* * * * *